Feb. 25, 1930.  C. E. MAYNARD  1,748,299
TIRE BUILDING APPARATUS
Filed Oct. 17, 1927
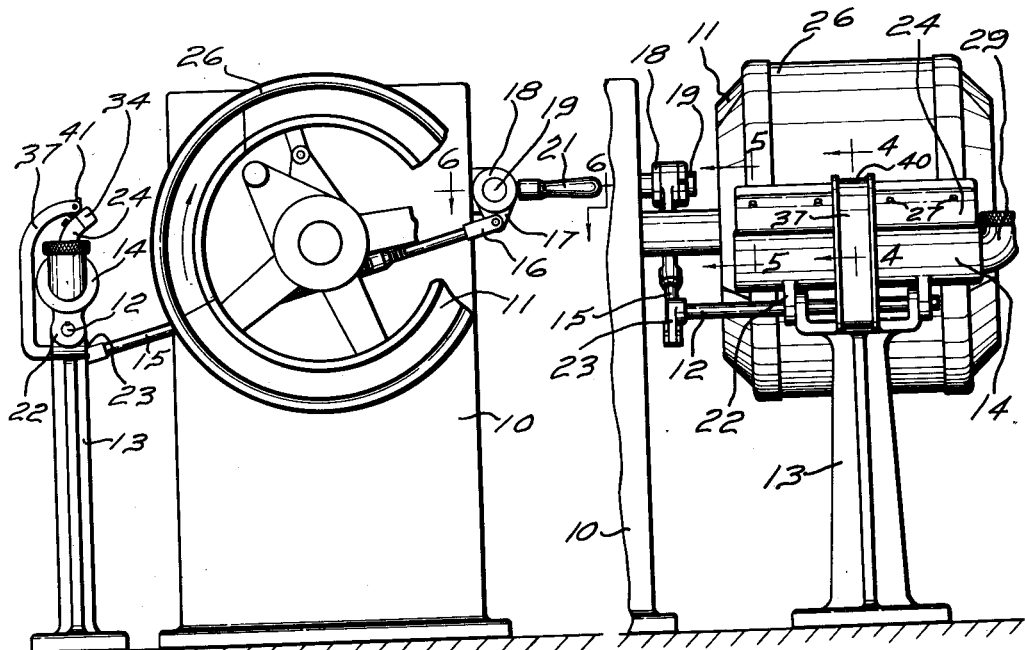
Fig. 1.  Fig. 2.
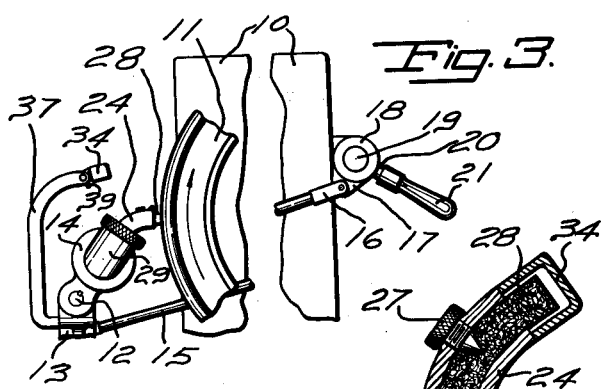
Fig. 3.
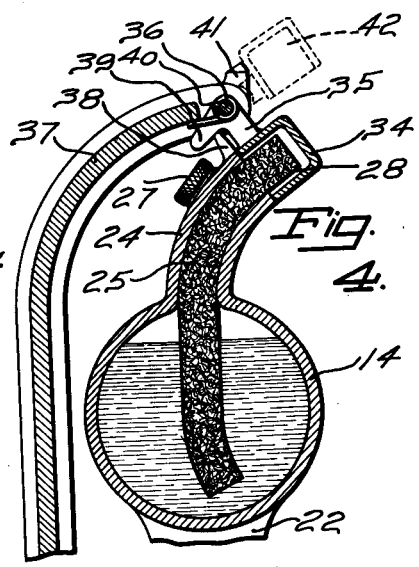
Fig. 4.
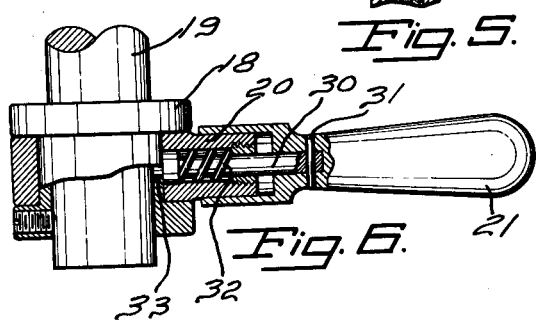
Fig. 5.
Fig. 6.
INVENTOR.
Charles Edgar Maynard
BY
Edward C. Taylor
ATTORNEY.

Patented Feb. 25, 1930

1,748,299

UNITED STATES PATENT OFFICE

CHARLES E. MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

TIRE-BUILDING APPARATUS

Application filed October 17, 1927. Serial No. 226,575.

In building pneumatic tire casings it is often found necessary, because of the drying out of the stock used, to freshen the stock with naphtha, gasoline, or other similar agents, this enabling the stock to regain its adhesiveness. Heretofore, a container of naphtha has been placed on or near the building machine so that the tire builder could reach over and with the air of a sponge, felt pad, or similar article, douse the tire carcass with the naphtha. In order to save the tire builder's time, this container has usually been kept open to the atmosphere causing a fire hazard and loss of naphtha due to its natural rapid vaporization. Then, too, a good deal of time was consumed by the tire builder in dousing the carcass with the small sponge or pad he used.

Throughout the specification let it be understood that when I refer to naphtha as a stock freshening agent I do not limit myself to that specific liquid but use it only as one of the numerous agents that could be used.

The object of my invention is to provide a means for supplying naphtha to a tire carcass quickly and with but a minimum amount of effort on the part of the tire builder. Another object is to supply a safe means whereby the naphtha is always in an enclosed container except when this container is moved by the tire builder. These objects and others will be clearly enlarged upon in the remainder of the specification and claims.

Referring to the drawings,

Fig. 1 shows a tire building machine, the drum of which is partially broken away, and an apparatus embodying my invention;

Fig. 2 is a view taken from the left of Fig. 1;

Fig. 3 is a view showing the apparatus in another position, parts of the tire building machine being broken away;

Fig. 4 is an enlarged sectional view taken on line 4—4 of Fig. 2;

Fig. 5 is an enlarged sectional view taken on line 5—5 of Fig. 2; and

Fig. 6 is a view taken substantially on line 6—6 of Fig. 1.

Although I have shown an apparatus made in accordance with my invention adapted for use with what is popularly known as a flat band tire building machine, I am not limiting myself to this type of machine as with but slight alterations this apparatus could be adapted to other types of tire building machines.

In the drawings a tire building machine 10 is shown with a collapsible building drum 11. Pivotally mounted at 12 to a standard 13, is a naphtha tank 14 adapted to pivot toward and from the drum 11 by means of a connecting rod 15. A rod end 16 attaches the rod 15 to one arm 17 of a bell crank pivoted on a fixed bearing 18 on a shaft 19 projecting from the side of the machine 10 at which the tire builder stands. The other arm 20 of the bell crank is provided with a handle 21.

The naphtha tank 14 has two lugs 22 projecting from the bottom of the tank. These lugs are keyed to the shaft 12 so that the movement of a link 23, also keyed to the shaft 12 and pivoted to the connecting rod 15, will cause the tank 14 to tilt toward the drum 11 when the handle 21 is moved downwardly. The tank is built the approximate width of the drum and has a wick housing projection 24 equally as wide so that the wick 25 will, as desired, spread across the whole width of a tire carcass 26 being built on the drum 11. Thumb screws 27, having their inner ends pointed, extend through the wick housing 24 to hold the projecting end 28 of the wick 25 in its desired relation to the end of the housing 24, the other end of the said wick being immerged in the naphtha. The tank is filled through the capped projection 29 at the end of the tank.

During the building of the tire carcass, when it is not necessary to use the naphtha, the handle 21 will be locked in position as shown in Fig. 1. This locking is effected by means of a spring compressed plunger 30 pinned at 31 to the handle 21. A spring 32 holds the end of the plunger 30 in a hole 33 in the bearing 18. When the handle is set in this position the naphtha tank 14 is held, through the connecting rod 15, in an upright position.

While the tank is upright, a cap 34, fitting over the entire end of the housing 24, covers the wick end 28, this also closing the tank 14 to prevent vaporization of the naphtha. This cap has a pair of lugs 35, a pin 36 passing through these lugs pivoting the cap to an arm 37 attached to the standard 13. A finger 38 on the housing 24 presses against a projection 39 on one of the lugs 35, this holding the cap firmly over the wick 25. Upon tilting the tank 14 toward the drum 11 a spring 40 will cause the cap to snap and remain up against lugs 41 on the arm 37 as shown at 42.

To use the apparatus, the tire builder grasps the handle 21, draws it toward him enough to release the plunger 30 from the hole 33 and then pushes the handle down as shown in Fig. 3. This will cause the tank 14 to tilt toward the drum 11 and supply the tire carcass with naphtha. Upon one revolution of the drum, the tire builder will tilt the tank 14 back to its upright position by drawing the handle back to its normal location, the spring 32 forcing the end of the plunger 30 into the hole 33.

Having thus described my invention, I claim:

1. In a tire building machine, an apparatus for supplying a stock freshening agent to a tire carcass being built upon the machine comprising a vessel for holding the freshening agent, a wick immersed in the freshening agent, a projecting housing on the vessel adaptable to hold the wick, said wick projecting out of the end of the housing, means for covering the projecting wick and open end of the housing, means for moving the projecting wick to and from contact with the tire carcass on the machine, and means for moving the housing covering over and from the projecting end of the wick.

2. In a tire building machine, a standard, a tank pivoted on the standard, a wick partially immersed within the tank, a housing on the tank adaptable to hold the wick, linkage attached to the tank adaptable for tilting the tank toward and from a tire carcass on the machine enabling a projecting portion of said wick to come in contact with the tire carcass, a pivotally mounted handle on the machine providing means for moving the said linkage, means for covering the projecting portion of the wick when it is not in contact with a tire carcass, and means for holding the covering means away from the wick when it is in contact with a tire carcass.

3. In a tire building machine, an apparatus for dousing a tire carcass being built on the machine, means for moving the apparatus into and out of contact with a tire carcass, and means for locking the apparatus in an inoperative position.

4. In a tire building machine, an apparatus for supplying a stock freshening agent to a tire carcass being built upon the machine comprising a tank for holding the stock freshening agent and a wick immersed within the tank adaptable to rub against the tire carcass as it moves past the wick.

5. In a tire building machine, an apparatus for supplying a stock freshening agent to a tire carcass being built upon the machine comprising a tank for holding the stock freshening agent, a wick immersed within the tank adaptable to rub against the tire carcass, and means for moving the apparatus into and out of contact with the tire carcass.

CHARLES E. MAYNARD.